SUBFLOOR CONVEYOR SWITCH APPARATUS

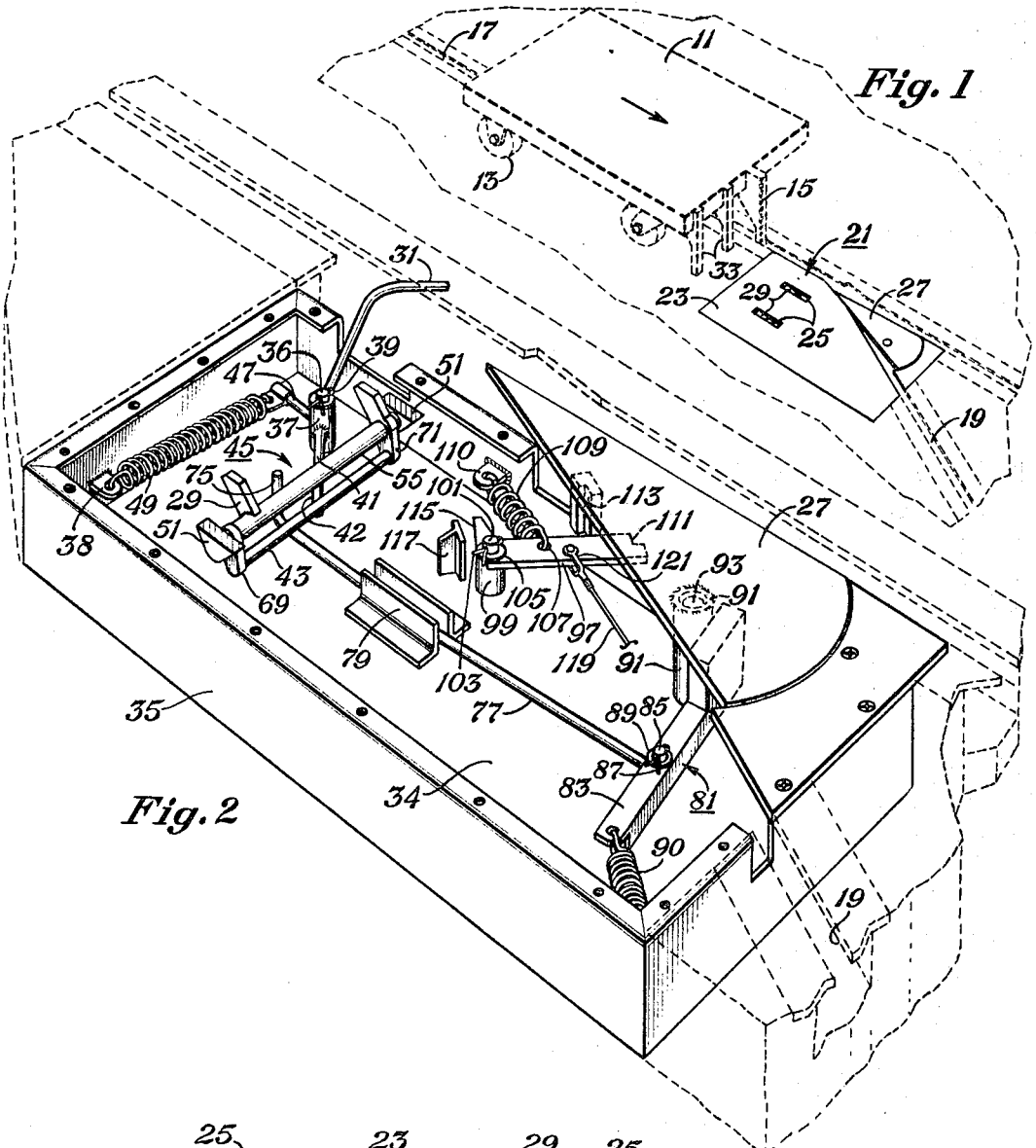
Fig. 1
Fig. 2
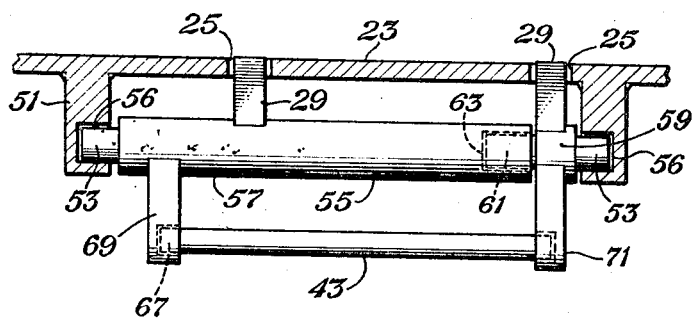
Fig. 3
INVENTORS
Norman R. Stevenson
Jesse B. Hutchinson
BY Wm. T. Wofford
Attorney Dec. 31, 1968  N. R. STEVENSON ET AL  3,418,945

Filed April 30, 1965

INVENTORS
Norman R. Stevenson
Jesse B. Hutchinson
BY Wm. T. Wofford
Attorney

Dec. 31, 1968    N. R. STEVENSON ET AL    3,418,945
SUBFLOOR CONVEYOR SWITCH APPARATUS
Filed April 30, 1965    Sheet 3 of 3
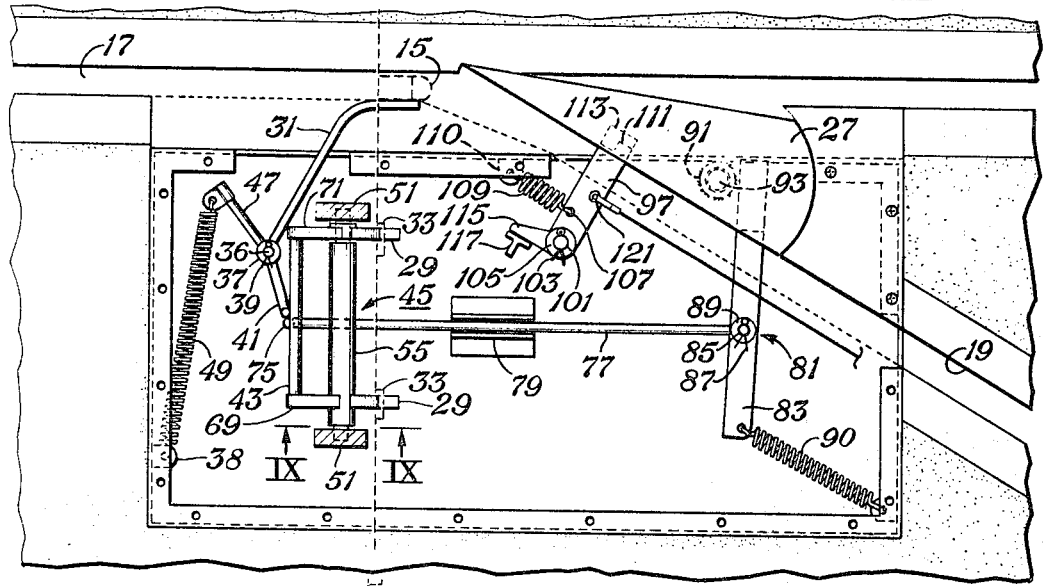
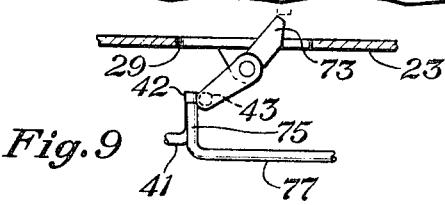
Fig. 9    Fig. 8
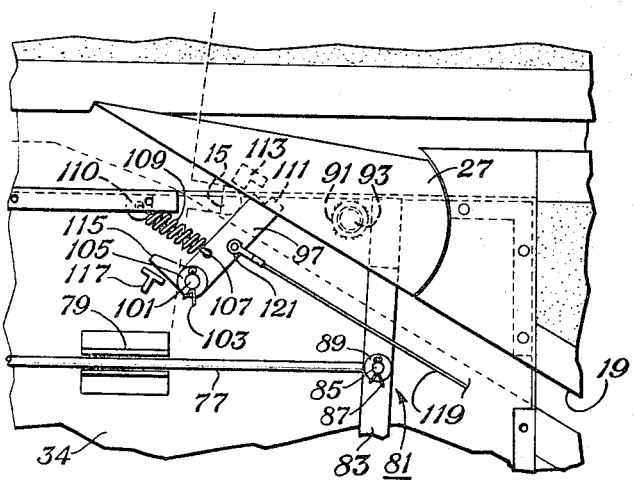
Fig. 10
INVENTORS
Norman R. Stevenson
Jesse B. Hutchinson
BY Wm. T. Wofford
Attorney United States Patent Office 3,418,945
Patented Dec. 31, 1968

3,418,945
SUBFLOOR CONVEYOR SWITCH APPARATUS
Norman R. Stevenson and Jesse B. Hutchinson, Dallas, Tex., assignors to M-H Equipment Co., Inc., Duncanville, Tex.
Filed Apr. 30, 1965, Ser. No. 452,265
3 Claims. (Cl. 104—172)

ABSTRACT OF THE DISCLOSURE

Switch apparatus for use in subfloor conveyor systems includes protrusions movable to above floor position upon engagement of an arm by a cargo tow pin. If two protrusions are engaged simultaneously by cargo truck code elements, then a linkage is actuated to move the switch to the opened spur position. If two protrusions are not engaged simultaneously, then a primary bar and a secondary bar which are connected to respective protrusions assume a skewed relation such that the linkage is not actuated. Relative lengths of first and second sections of the primary bar may be changed, so that a large number of protrusion code combinations may be obtained. The switch is spring biased solely to the closed spur position and is retained in the open spur position by means of a latch which is disposed in the path of the tow pin of cargo trucks entering the spur slot so as to be positively moved to a position to release the switch from the opened spur position. A latch disabling means is secured to the latch and is operable independently of truck tow pins to selectively prevent latching of the switch in the opened spur position.

---

Our invention relates in general to conveyor systems, and in particular to switch apparatus in subfloor conveyor systems for directing conveyor carts or trucks into selected spur slots that communicate with a main slot in the floor.

Previously, subfloor conveyor systems have been developed whereby conveyor trucks are directed along designated routes in a factory or plant. In such systems tow pins depend from conveyor trucks and extend into a main slot in the floor. A conveyor, commonly the chain type, engages the tow pins and propels the conveyor trucks. Spur slots communicate with the main slot at selected areas of the factory or plant so that designated conveyor trucks may be withdrawn from the main slot. To effect such withdrawal, a switch apparatus is provided at the intersection of each spur slot and the main slot, and means are provided for selectively actuating the switch so that the tow pins of selected conveyor trucks travel into the associated spur slot. An encoder arrangement is provided so that only selected conveyor trucks are directed into a selected spur slot.

Previously developed subfloor conveyor systems and their switch apparatus have a number of disadvantages. In many instances, for example, the installation of the switching and related control apparatus is time-consuming and expensive. Each switch itself and the control system associated therewith have separate pieces that must be installed at various locations along the floor. Therefore, installation time and expense are increased by the need for individual attention to these separate pieces.

Some of the prior art conveyor systems have arrangements whereby the switch actuating apparatus normally resides in out-of-the-way, subfloor positions. Means are provided for raising portions of this apparatus to above-the-floor positions when conveyor trucks approach so that the switches may be controlled by the trucks themselves.

Although exclusively mechanical systems are common, they nonetheless have complexities with resulting disadvantages. Electrical components are usually avoided in favor of the confidence inspiring mechanical components.

But even the prior art mechanical components lack the simplicity that is the requisite for reliability. This lack of simplicity is particularly apparent in the encoder devices of prior art subfloor conveyor systems. The encoder devices determine which spur a designated conveyor truck will follow. The number of coding combinations possible with any encoder device is important, since this establishes the number of spur slots into which the conveyor trucks may be selectively guided. The extremely limited number of coding combinations possible with prior art mechanical encoded devices is a significant disadvantage.

Some prior art subfloor switch apparatus includes the use of a latch for holding an associated switch in a selected position, and means for unlatching the switch after a conveyor truck is well inside the spur. The means for activating the latching apparatus and for releasing it have complexities that arise due to the distance separating the components and the manner of their construction.

It is the general object of our invention to provide in a subfloor conveyor system an improved switch apparatus.

Another object of our invention is to provide in a subfloor conveyor system an improved switch apparatus wherein improved subfloor to above-the-floor coding elements and related apparatus are utilized.

Another object of our invention is to provide in a subfloor conveyor system an improved switch latch that holds the switch in a selected position, and improved means for unlatching the switch.

These and other objects are effected by our invention as will be apparent from the following description taken in accordance with the accompanying drawings, forming a part of this application, in which:

FIG. 1 is a schematic perspective view which shows a conveyor truck, main and spur slots, and a subfloor switch apparatus;

FIG. 2 is a fragmentary sectional view of a subfloor switch apparatus constructed in accordance with the principles of our invention, with the cover plate removed to expose the inner components of the apparatus;

FIG. 3 is a fragmentary perspective view of the toggle apparatus which is visible in FIG. 2;

FIG. 8 is a plan view of the switch apparatus when moved to the "open spur" position;

FIG. 9 is a sectional view as seen looking along the lines IX—IX of FIG. 8; and

FIG. 10 is a fragmentary plan view which shows the tow pin of a conveyor truck engaging and moving the latch that temporarily holds the switch in the "open spur" position illustrated in FIG. 8.

Figure 4:
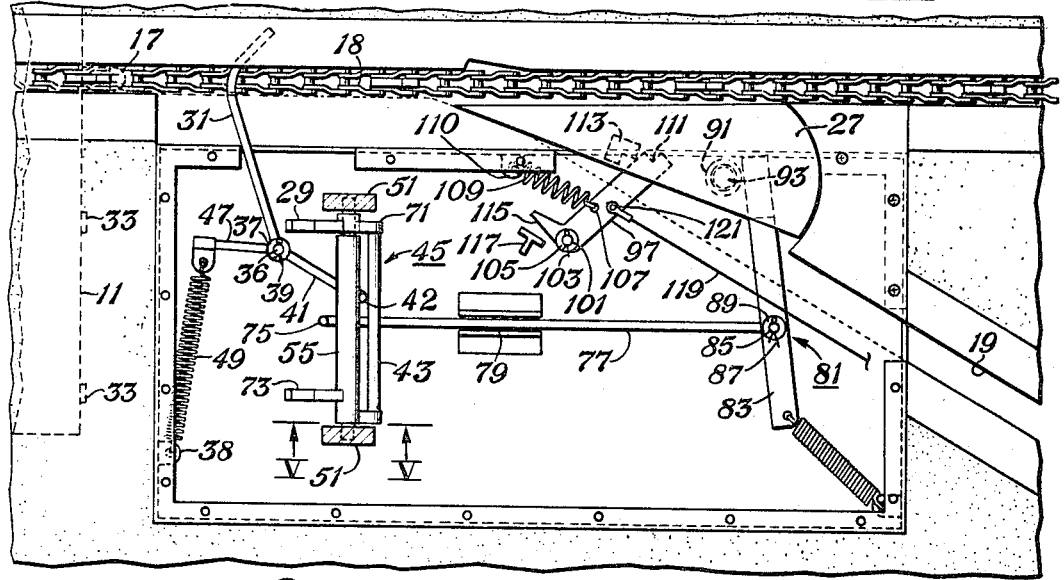
FIG. 4 is a plan view of the switch apparatus of FIG. 1, showing the apparatus before movement of any of its components by a conveyor truck.

Referring initially to FIG. 1, a conventional conveyor truck 11 (shown in phantom), with wheels 13 and a tow pin 15, is shown with the tow pin extending into a main slot 17 of a subfloor conveyor system.

The conveyor has propulsion means, usually a chain 18 (see FIG. 4), that engages and moves the tow pin and the conveyor truck forward by means of a conventional dog (not shown). So that the conveyor truck may be moved from the main slot 17 of the conveyor system, one or more spur slots 19 communicate with and extend from the main slot. A switching apparatus 21 which is constructed in accordance with the principles of our invention is visible in FIG. 1. The upper surface of the switch apparatus has a cover plate 23 with apertures 25 therein, and a switch 27 that is pivotally attached to the apparatus and movable between "opened spur" and "closed spur" positions. Visible through the apertures 25 are protrusions 29 that normally reside in subfloor positions. These protrusions are moved to an above-the-floor position by means of engagement of the tow element 15 with an arming level 31 that is clearly visible in FIG. 2. The protrusions 29, when moved to the above-the-floor position, are capable of being engaged by laterally coded elements 33 of a conveyor truck (see FIG. 1). Only those conveyor trucks with coded elements 33 spaced the correct distance from tow pin 15 can engage the protrusions 29. The coded elements on each conveyor truck are preferably laterally adjustable so that selected trucks may be quickly adapted for movement into the spur slot 19. It should be understood that normally there are a plurality of switch apparatus 21 in each conveyor system. The protrusions 29 of each switch appartus have different lateral placements so that selected conveyor trucks move only into a selected conveyor slot.

The arming level 31 is pivotally secured to the floor 34 of a housing 35 for movement about a substantially vertical axis. This axis is established by attachment of a post 36 to the floor 34. A sleeve 37 of the arming lever surrounds post 36 and the two are joined by means of a suitable fastener, such as a cotter key 39. Arming lever 31 has an extension 41 with an upstanding end portion 42 that engages a secondary bar 43 of a toggle apparatus 45. Another extension 47 of the arming lever 31 is attached to one end of a tension spring 49. The opposite end of the tension spring 49 is connected to the housing 35, as shown at 38. Thus, the arming lever 31 is urged in a counterclockwise direction, as seen from above, by the tension spring 49.

The toggle apparatus 45 is preferably secured to the cover plate 23 of the switch apparatus by means of support blocks 51. As may be seen in FIG. 3, stub axial means 53 extend axially from a primary bar 55 and rotatably engage the apertures 56 of the support blocks 51. Primary bar 55 is divided into first and second sections 57, 59. These sections are rotatably secured to each other by means of a pin 61 on section 59 that engages a mating aperture 63 on section 57. To the second section 59 is rotatably secured secondary bar 43. The opposite end 67 of secondary bar 43 is rotatably secured to a foot or radial extension 69 that depends from the first section 57 of primary bar 55. Thus, it may be seen that the primary and secondary bars 55, 43 are free to move relative to each other, and in skewed positions with respect to each other. The purpose in this arrangement will become apparent in the operational description.

Figure 5:
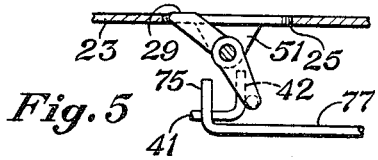
FIG. 5 is a sectional view as seen looking along the lines V—V of FIG. 4.
Figure 6:
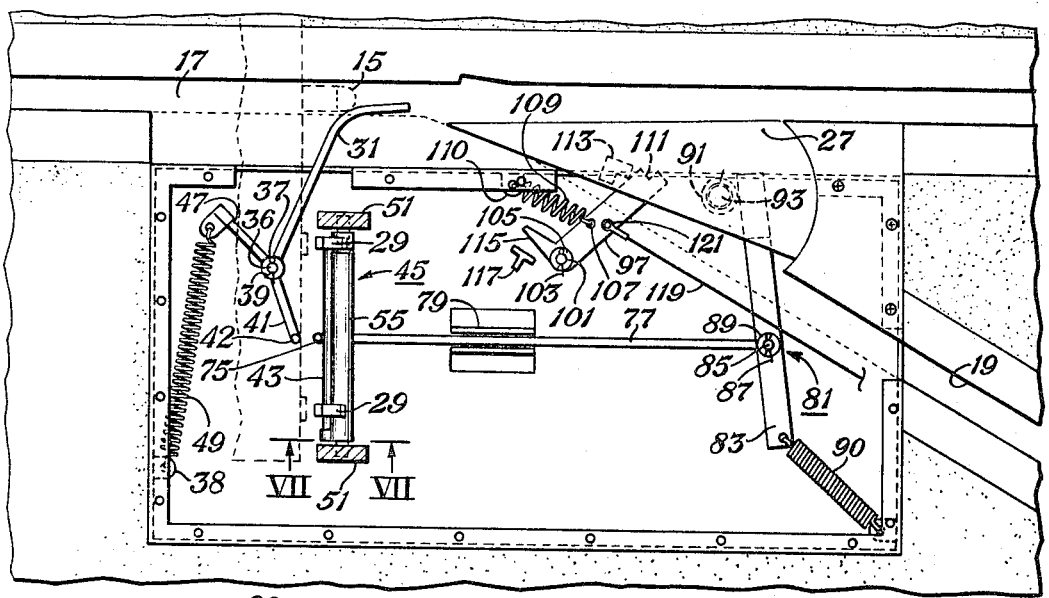
FIG. 6 is a plan view showing a sequence in the operation of the switch apparatus in which the tow element of a conveyor truck has engaged and moved an arming lever that prepares the switch apparatus for subsequent operations.
Figure 7:
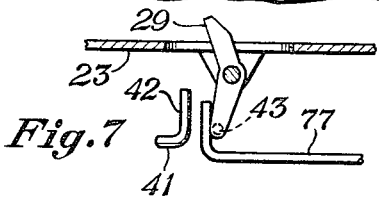
FIG. 7 is a sectional view as seen looking along the lines VII–VII of FIG. 6 to show the disposition of toggle apparatus after movement by the arming lever.

As may be seen in FIG 3, foot 69 on first section 57 of primary bar 55 and radial extension 71 on second section 59 of primary bar 55 extend outward and in generally opposite directions from a pair of aligned protrusions 29 that are secured respectively to the first and second sections 57, 59 of primary bar 55. The purpose of this arrangement is to cause the protrusions 29 to move to a position to normally extend through the apertures 25 of cover plate 23 due to the force of gravity acting on the relatively heavy secondary bar 43, foot 69 and extension 71 (see FIG. 1). A spring may be added to assist or effect this movement. When arming lever 31 is rotated clockwise as viewed from above, the upstanding end portion 42 of extension 41 tends to disengage the approximate midsection of secondary bar 43 of toggle apparatus 45 and thus the toggle apparatus 45 rotates clockwise, as seen in FIG. 7. Hence, the protrusions 29 move above the surface of cover plate 23, as may be seen in FIGS. 6 and 7. FIGS. 4 and 5 show the positions of the arming lever, the toggle apparatus and the remaining portions of the switch apparatus before there is any cooperative relationship between the switch apparatus and a conveyor truck. Therefore, a comparison of FIGS. 4 and 5, and FIGS. 6 and 7 illustrates the movements of the switch apparatus before and after the arming of the apparatus in preparation for subsequent movements.

After arming toggle apparatus 45, as described above, and in the event secondary bar 43 of toggle apparatus 45 is further rotated in the clockwise direction as viewed in FIG. 5, the upwardly extending protrusion 75 of a connecting linkage 77 will be engaged by secondary bar 43. FIGS. 6 and 7 illustrate the position of arming lever 31 when it has been rotated in a clockwise direction by the engagement of tow pin 15 of conveyor truck 11. When in this position, the upstanding portion 42 of arming lever extension 41 still engages the midsection of secondary bar 43 but has let the bar 43 rotate clockwise under the influence of gravity. As viewed in FIG. 7, the protrusions 29 now extend through the apertures 25 and above the upper surface of cover plate 23. Connecting linkage 77 preferably has guide means 79, for the linkage is otherwise free to rotate due to the pivotal connection at 81 to an arm 83. The pivotal connection 81 in this instance is effected by forming an upwardly facing extension 85 on connecting linkage 77, by inserting the extension 85 into an aperture in arm 83, and by using suitable retainer means, such as cotter key 87. A washer 89 between cotter key 87 and arm 83 is helpful in maintaining smooth relative movement between the parts. Arm 83 is connected by suitable means, such as welding, to switch 27, so that the two are rigidly secured to each other. Thus, continued movement in a clockwise direction of secondary bar 43 urges connecting linkage 77 to the left, as viewed in FIG. 8, until switch 27 is rotated in a clockwise direction and to the "open spur" position shown in FIG. 8. A tension spring 90 connected to arm 83 and housing 35 tends to urge the switch to the "closed spur" position. It should be understood that the upstanding end portion 42 of arming lever extension 41 and the upwardly extending protrusion 75 of connecting linkage 77 have clearance spaced between them as they move from the FIG. 6 to the FIG. 8 positions. This enables them to pass each other without interference.

To permit pivotal movement of switch 27, a sleeve 91 is rigidly secured, as by welding, to the switch 27, and a post 93 is secured to the floor 33 of housing 35 by suitable fastener means such as welding.

To retain the switch 27 in the "open spur" position shown in FIG. 8, a latch 97 is rigidly secured to a rotatable sleeve 99 (see FIG. 2) that surrounds a post 101. A cotter key 103 or other suitable means retains the sleeve on the post. Preferably, a washer 105 is provided to insure smooth relative movement between the parts. Latch 97 has an aperture 107 which receives one end of a tension spring 109. The opposite end of the tension spring is secured to a protrusion 110 that extends from the housing 35. It may, therefore, be seen that the tension spring 109 urges the latch 97 in a counterclockwise direction as viewed from above. Latch 97 has a notched end portion 111 that engages a mating protrusion 113 that is secured to the switch 27. (This occurs when the switch is in the "open spur" position shown in FIG. 8.)

Additional stop means is preferably provided, which in this instance includes an extension 115 formed on latch 97 and a mating post 117 that is rigidly secured to the housing 35. From the above description of the latch 97, it may be seen that it moves to a position to retain the switch 27 in the "open spur" position when such position is established by movements of the switch apparatus. Mechanical linkage means such as cable 119 may be connected to latch 97, as designated by the numeral 121. The cable 119 may extend down the spur slot 19 to an overload prevention device (not shown) that exerts a force on cable 119 to rotate the latch 97 in a clockwise direction (as viewed in FIG. 8) so that the latch will fail to hold the switch 27 in the "open spur" position of FIG. 8. Such overload prevention devices are well known in the art and are used to prevent the normal functioning of the switch apparatus for preventing conveyor trucks from trying enter spurs that are loaded to capacity with conveyor trucks. This linkage means 119 may be operated by hand by merely exerting an axial force upon it.

In operation and when a conveyor truck 11 initially approaches the switch apparatus 21, the switch 27 is in the "closed spur" position, and thus the main slot 17 of the system is opened. The components of the switch apparatus occupy the positions shown in FIGS. 2, 4 and 5 at this initial stage. Arming lever 31 is urged in the counter-clockwise direction, as viewed from above, by means of tension spring 49. In this position, the arming lever 31 extends across the main slot 17 and into the path of the tow pin 15 of an oncoming conveyor truck. As may be seen in FIG. 5, the orientation of the toggle apparatus 45 is such that the protrusions 29 secured to primary bar 55 are below the level of the supper surface of cover plate 33.

Then tow pin 15 of an oncoming conveyor truck engages the arming lever 31, as seen in FIG. 6. Arming lever 31 is rotated by the moving tow pin 15 in a clockwise direction and against the force of tension spring 49. The upstanding portion 42 of extension 41 still engages the secondary bar 43 of toggle apparatus 45, which also rotates clockwise due to the force of gravity operating on the toggle apparatus. As may be seen in FIG. 7, the protrusions 29 then extend through apertures 25 of cover plate 23. At approximately this position, the upwardly extending extension 75 on connecting linkage 77 engages the secondary bar 43 of the toggle apparatus, as may be seen in FIGS. 6 and 7.

Then, the laterally encoded elements 33 of the conveyor truck engage the protrusions 29 that extend through apertures 25 of cover plate 23. The protrusions 29 of the toggle apparatus are then forcefully moved in a clockwise direction (as seen in FIG. 9), and the secondary bar 43 of the toggle apparatus begins to forcefully move the connecting linkage 77 to the left (as seen in FIG. 8). Since connecting linkage 77 is pivotally attached to the arm 83 of switch 27, as seen in FIG. 8, the switch is rotated in a clockwise direction, as viewed from above, and to the "open spur" position. When the switch arrives at this position, latch 97 moves in a counterclockwise direction, as viewed from above, and into the position seen in FIG. 8. This maintains switch 27 in the "open spur" position until the tow pin 15 of the conveyor trucks can move into the spur slot 19, which is partially defined by one edge of switch 27 and a confronting edge on the cover plate 23.

Just prior to the time tow pin 15 reaches the switch 27, the laterally encoded elements 33 of conveyor truck 11 disengage protrusions 29 of the toggle apparatus 45. This causes the toggle to reassume the position seen in FIGS. 1 and 2.

In the event that only one laterally encoded element 33 of the conveyor truck engages a protrusion 29 of toggle apparatus 45, primary bar 55 and secondary bar 43 will move into skewed positions with respect to each other. The encoder element merely pushes the engaged protrusion rearward and eventually moves past it without moving connecting linkage 77. Thus, accidental movement of only one protrusion will not actuate the switch.

When the tow pin 15 of the conveyor truck reaches the position of latch 97, it forcefully engages and moves the latch in a clockwise direction, as seen in FIG. 10, and away from the mating protrusion 113 that is secured to switch 27. This enables the switch 27 to return to a "closed spur" position so that the following conveyor trucks will pass down the main slot 17 unless their laterally coded elements 33 engage the protrusions 29 of the toggle apparatus 45 to once again move the switch to the "open spur" position shown in FIG. 8. In the event the spur becomes filled to capacity with conveyor trucks, a conventional overload device is engaged by one of the conveyor trucks so that the cable 119, which is attached to latch 97, moves the latch to a position such that it will not engage the mating protrusion 113 on switch 27. The biasing action of coil spring 90 moves switch 27 to the "closed spur" position of FIG. 1 unless latch 97 retains switch 27 in the "open spur" position. For this reason, if the overload prevention device acting on cable 119 pulls latch 97 in a clockwise direction, as viewed from above, the switch 27 will not remain in the "open spur" position. Thus, the conveyor truck will continue to travel along main slot 17, even though the laterally encoded elements 33 engage the protrusions 29 and initially actuate the switch.

It should be apparent from the foregoing description that we have provided an invention having significant advantages. The provision of a switching apparatus that may be installed in a conveyor system as a single unit saves time and decreases the expense of installation. Moreover, repairs are easier to accomplish with a switch apparatus of this type, since the great majority of components are in one restricted area.

The use of toggle apparatus 45 as an actuation device for the switch provides significant advantages. The toggle apparatus has a construction that enables the provision of a large number of possible coded combinations. That is, if the protrusions 29 of toggle apparatus 45 are one unit wide and the length of primary bar 55 is 10 units long, then it may be demonstrated that there are forty-five possible combinations of lateral placements of the protrusions 29. Referring to FIG. 3, the protrusion 29 on the left may occupy nine different positions when the protrusion on the right is positioned as shown. If the protrusion on the right is moved one position to the left (the lengths of first and second sections 57, 59 of primary bar 55 are altered so that the right protrusion remains on second section 59), then the protrusion on the left may occupy eight different positions with respect to the protrusion on the right. By moving the right protrusion further to the left, further combinations may be obtained until finally the two protrusions are adjacent each other on the left side of primary bar 55. Such adjustments produce a total of forty-five possible combinations of positions of the protrusions 29. A greater number of combinations may be obtained by lengthening primary bar 55 or by decreasing the width of the protrusions. Thus, at least forty-five spurs may be conveniently installed in the conveyor system by using out toggle apparatus, and only ten fixed positions are required on the cart. This is enough possible combinations to handle the needs of conveyor systems in many factories and plants. It is practicable to connect two primary bars 55 in parallel and with a mutual secondary bar so that one hundred or more combinations are possible. This possible parallel arrangement and the increased number of combinations is one of the advantages of using the toggle apparatus.

Another advantage of our invention is that the means used to unlatch the switch so that it may be moved back to the "closed spur" position has fail-safe reliability. Due to its advantageous construction, there is little danger that this latching device can be fouled or its operation interfered with.

Moreover, the construction of the switch apparatus enables the convenient installation of all components of the conveyor system on one side of the primary slot.

While we have shown our invention in only one form, it will be obvious to those skilled in the art that it is not so limited, but is susceptible of various changes and modification without departing from the spirit thereof.

We claim:

1. In subfloor conveyor systems of the type that propel trucks by means of engagement with tow pins secured to the trucks, apparatus for actuating a switch by means of engagement with a truck, said apparatus comprising:

(a) a support structure;

(b) a subfloor primary bar secured to said support structure for rotation about a substantially horizontal axis, the length of said primary bar being divided into two sections that are rotatable with respect to each other;
(c) a subfloor secondary bar generally in parallel alignment with said primary bar;
(d) means for rotatably securing the respective ends of said secondary bar to the two sections of said primary bar to permit relative movement between said bars so that said secondary bar may be skewed with respect to said primary bar; and
(e) a protrusion secured to and extending radially from each said section of said primary bar for engagement with coded elements on selected conveyor trucks.

2. In subfloor conveyor systems of the type that propel trucks by means of engagement with tow pins secured to the trucks, apparatus for moving subfloor protrusions into communicating relation with selected trucks, said apparatus comprising:
(a) a support structure;
(b) a subfloor primary bar secured to said support structure for rotation about a substantially horizontal axis, the length of said primary bar being divided into two sections that are rotatable with respect to each other;
(c) a subfloor secondary bar generally in parallel alignment with said primary bar;
(d) means for rotatably securing the respective ends of said secondary bar to the two sections of said primary bar to permit relative movement between said bars so that said secondary bar may be skewed with respect to said primary bar;
(e) a protrusion secured to and extending radially from each said section of said primary bar for movement from subfloor to above-the-floor positions for engagement with coded elements on selected conveyor trucks; and
(f) an arming lever pivotally connected to said support structure, with one end being engageable with the tow pin of the conveyor trucks and the opposite end engageable with said secondary bar to move said protrusions to the above-the-floor position.

3. Switch apparatus for use in a subfloor conveyor system wherein cargo trucks are propelled by tow pin engaging means along a main line slot, with spur slots communicating with said main line slot, said switch apparatus comprising:
(a) a support structure;
(b) a switch pivotally attached to said support structure for movement to opened and closed spur positions;
(c) bias means urging said switch solely toward the closed spur position;
(d) actuating means responsive to engagement of said apparatus by coded elements on selected cargo trucks for moving said switch to the opened spur position; and,
(e) a latch pivotally secured to said support structure with one portion thereof being engageable with said switch upon movement of same to the opened spur position to retain said switch in said opened spur position, said latch being disposed in the path of the tow element of cargo trucks entering said spur slot so as to be positively moved to a position to release said switch from said opened spur position.

References Cited

UNITED STATES PATENTS

| | | | |
|---|---|---|---|
| 2,936,718 | 5/1960 | Bradt et al. | 104—172 |
| 3,103,183 | 9/1963 | Bradt | 104—172 |
| 3,103,895 | 9/1963 | Bradt | 104—172 |
| 3,262,397 | 7/1966 | Bradt | 104—172 |
| 3,115,846 | 12/1963 | Dehne | 104—178 |

ARTHUR L. LA POINT, *Primary Examiner.*

D. F. WORTH, *Assistant Examiner.*

U.S. Cl. X.R.

104—178